United States Patent
Ichi et al.

(10) Patent No.: US 6,449,051 B2
(45) Date of Patent: *Sep. 10, 2002

(54) IMAGE PRODUCING APPARATUS HAVING A FUNCTION TO CONTROL DOCUMENT DATA

(75) Inventors: Yoshihiro Ichi, Toyokawa (JP); Henry Chin, Portland, OR (US); Steve McCallion, Portland, OR (US); Scott Thorpe, Portland, OR (US); Peter Wyatt, Los Angeles, CA (US)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,041

(22) Filed: Mar. 30, 1998

(51) Int. Cl.[7] .................... G06F 15/00; H04N 1/21; H04N 1/00
(52) U.S. Cl. ............... 358/1.13; 358/401; 358/296; 271/298; 399/405
(58) Field of Search ................ 358/1.1, 1.6, 1.9, 358/1.13, 1.15, 1.16, 1.18, 401, 404, 434, 437, 442, 444, 468, 296, 400, 498, 407; 355/321, 323; 399/405; 271/278, 298

(56) References Cited

U.S. PATENT DOCUMENTS

| | | | | |
|---|---|---|---|---|
| 4,935,771 A | * | 6/1990 | Ito ........................ 355/66 |
| 5,012,280 A | * | 4/1991 | Tsutsumi et al. ........... 355/206 |
| 5,036,361 A | * | 7/1991 | Fillon et al. ............... 355/209 |
| 5,131,079 A | * | 7/1992 | Miyawaki et al. ........... 395/118 |
| 5,159,324 A | * | 10/1992 | Ohtani et al. .............. 340/712 |
| 5,200,830 A | * | 4/1993 | Imaizumi et al. ........... 358/442 |
| 5,883,724 A | * | 3/1999 | Yamada .................... 358/442 |
| 5,982,510 A | * | 11/1999 | Funahashi .................. 358/468 |
| 6,006,012 A | * | 12/1999 | Shimizu .................... 395/113 |
| 6,072,600 A | * | 6/2000 | Wertsberger ................ 358/400 |
| 6,115,141 A | * | 9/2000 | Kim ........................ 358/407 |

FOREIGN PATENT DOCUMENTS

| | | |
|---|---|---|
| JP | 04362662 | 12/1992 |
| JP | 08237419 | 9/1996 |
| JP | 08237422 | 9/1996 |
| JP | 08256232 | 10/1996 |

* cited by examiner

Primary Examiner—Kimberly A. Williams
(74) Attorney, Agent, or Firm—McDermott, Will & Emery

(57) ABSTRACT

An image producing apparatus having a function to display information concerning documentation control, comprises display units in paper stack along with display units in a main body of the apparatus. The display unit placed nearby the paper stack displays information concerning documentation control of the paper discharged into the paper stack, and display unit in the main body displays information concerning documentation control of the image data stored in a memory. The apparatus has the capabilities of changing the displayed contents easily without replacing the labels and of confirming the situation of outputted images. Furthermore, the document data can be controlled based on operations in an operation unit of the main body of the apparatus.

4 Claims, 10 Drawing Sheets

FIG. 4 (a)

| TRANSMITTING SIDE | DOCUMENT NAME |
|---|---|
| PC(A) | MATERIALS FOR MEETING A |
| PC(B) | MATERIALS FOR MEETING B |
| PC(C) | MATERIALS FOR MEETING C |

FIG. 4 (b)

| TRANSMITTING SIDE | DOCUMENT NAME |
|---|---|
| PC(C) | MATERIALS FOR MEETING C |

FIG. 4 (c)

| TRANSMITTING SIDE | DOCUMENT NAME |
|---|---|
| PC(A) | MATERIALS FOR MEETING A |
| PC(B) | MATERIALS FOR MEETING B |

FIG. 4 (d)

| TRANSMITTING SIDE | DOCUMENT NAME |
|---|---|
| PC(B) | MATERIALS FOR MEETING B |

IMAGE PRODUCING APPARATUS HAVING A FUNCTION TO CONTROL DOCUMENT DATA

BACKGROUND OF THE INVENTION

This invention concerns an image producing apparatus, particularly the printing devices comprising the function to control document data.

Some of the conventional printing devices are equipped with multiple discharge trays in the discharge unit where the paper with produced images is discharged so that the paper is discharged into appropriate discharge trays based on specified information. The display unit with paper labels, etc. in the discharge tray is known as the one that will distinguish each individual discharge tray aside from the display units that are equipped in the main body of the printing device.

Also, some of the conventional printing devices have functions to delete data and to perform test printing based on the instruction from the operation unit; whereas, a personal computer that is connected to the printing device will control the other areas concerning printing and outputting.

However, there was a problem with display units that are equipped in discharge units in the above-mentioned conventional printing devices. The problem was that the displayed contents could not be easily changed once the labels were attached for display. In order for the displayed contents to be changed, the labels had to be replaced.

As mentioned earlier, the operation performed in the operation unit equipped in printing devices cannot control all the processes; instead, the personal computer has to be used to give commands to and control most of the operations. The operations in the operation unit equipped in the printing devices have made the processes inconvenient. As examples, the operations were not set up in such a way that the printing device operates based on various instructional information contained in the printed data and that the stored data in the memory in the printing devices was transmitted to another printing device.

SUMMARY OF THE INVENTION

The purpose of this invention is to resolve the above-mentioned problems and to present an image producing apparatus comprising display units in paper stacks along with display units in the main body of the apparatus. The apparatus will have the capabilities of changing the displayed contents easily without replacing the labels and of confirming the situation of outputted images.

Furthermore, the other purpose of this invention is to present the image producing apparatus comprising the function to control previously mentioned various data except for the functions to delete data and perform test printing with the operation in the operational unit on the main body of the apparatus.

According to one aspect of the present invention, an image producing apparatus having a function to display information concerning documentation control, comprising: an image producing unit which produces images on paper; a memory unit which stores image data to be outputted; a paper stack which contains the paper with produced images that is discharged from the image producing unit; a first display unit which displays information concerning documentation control for image data produced on the paper that is discharged into the paper stack; a second display unit which displays information concerning documentation control for image data that is not produced nor discharged into the paper stack, but stored in the memory unit; and, a control device which controls display in the first display unit and the second display unit.

In this composition, the first display unit will display the information concerning documentation control for the documents that are discharged into the paper stack. Whereas, the second display unit will display the information concerning documentation control for the documents that were not discharged into the paper stack, but stored in the memory unit. Users can easily check both display units and confirm the situation concerning the output of documents.

According to another aspect of the present invention, an image producing apparatus having a function to control document data, comprising: an image producing unit which produces an image based on image data which is received from an external device; a first paper stack which has multiple paper stack trays for containing paper with produced images that is discharged from the image producing unit; a second paper stack which has a paper stack tray for containing paper with produced images that is discharged from the image producing unit; and, a control device which executes a control so that, if the data received from the external device contains a data that specifies a paper stack unit, the data is processed for image production and discharged, and then the paper is discharged into the designated paper stack tray in the first paper stack.

In this composition, each one of the outputted papers with multiple image data that belong to different groups will be contained in respective and vacant paper stack trays separately. Therefore, there will be no occasions where different documents are intermingled and discharged into the same paper stack tray.

According to a further aspect of the present invention, an apparatus having a function to control document data, comprising: an image producing unit which produces images based on image data received from an external device; a paper stack which has multiple paper stack trays for containing paper with produced images that is discharged from the image producing unit; a control device which executes a control so that, if paper is produced with image data which is included in a group that is different from the already-discharged image data, the paper is contained in a paper stack tray that have not contained any paper.

In this composition, if the data received from the external device contains the data that specifies a paper stack, the data will be processed for image production and will be discharged; as a result, the paper will be discharged into the designated paper stack tray in the first paper stack. The first paper stack can be used when images are produced and outputted based on the operations commanded in the main body of the apparatus.

According to a further aspect of the present invention, an image producing apparatus having a function to control document data, comprising: a memory which stores data received from an external device; an operation device which confirms the data stored in the memory; an image producing unit which produces images based on the data stored in the memory; and, a control device which sets up a control mode in response to an operation in the operation device, and controls the image producing unit.

This composition allows a control mode to be set up and data control to be performed easily based on the operations of the operating members in the main body of the apparatus.

BRIEF DESCRIPTION OF THE DRAWINGS

FIGS. 4(a), 4(b), 4(c) and 4(d) are views illustrating display examples on the display unit in the main body;

DETAILED DESCRIPTION OF THE PREFERRED EMBODIMENT OF THE PRESENT INVNENTION

Figure 1:
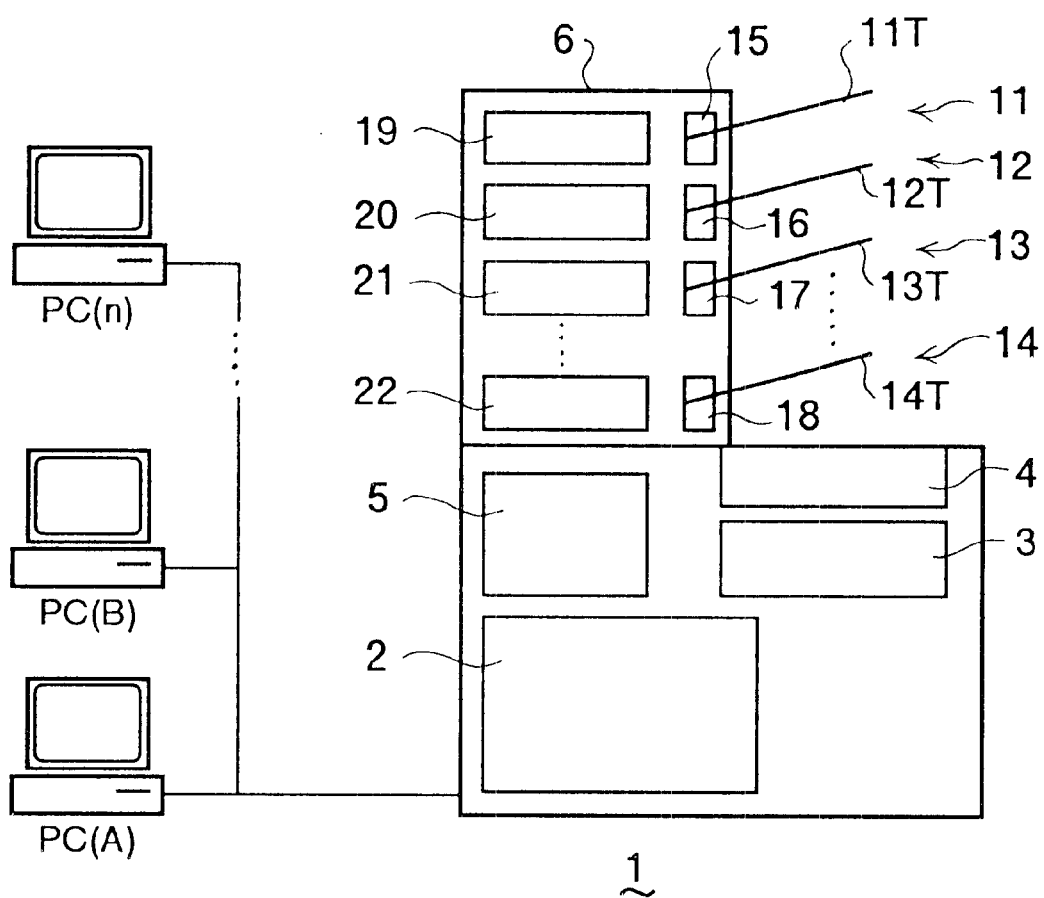
FIG. 1 is a view illustrating the composition of the printing system comprising the function to display the information concerning documentation control in the first embodiment in this invention.

The following are the explanations concerning a form of execution that embodies the image producing apparatus of this invention. Refer to FIG. 1, which illustrates the composition of the printing system comprising the function to display the information concerning documentation control as the first embodiment of the present invention. This system comprises printer 1 and multiple personal computers as external devices, referred to as PC (A), PC (B). . . and PC (n) that are connected to the printer. Printer 1 is equipped with printing unit 2 (image producing unit), such as a laser printer, etc. that will produce images on paper, controller 3 (control device) that will control the printer, display unit 4 (No.2 display unit) in the main body that will display various information concerning documentation control—particularly, the information of documentation that is stored in the memory and that has not been printed out or outputted yet, memory 5 (memory device) that stores image data to be outputted and paper discharge device 6 where the outputted paper with images is discharged and stacked. Display unit 4 in the main body comprises a touch panel, etc. and concurrently takes the role of control unit (command device) that allows users to send commands of printing and others to the main body of the printer.

Paper discharge device 6 is equipped with discharge unit (A)11, discharge unit (B)12 . . . and discharge unit (n)13 in the No.1 paper stack, as well as the special discharge unit 14 in the No.2 paper stack. Each one of the discharge units respectively comprises discharge trays—11T, 12T, 13T and 14T, as well as paper discharge sensors (detectors)—15, 16, 17 and 18. Each one of them comprises display units—19, 20, 21 and 22 in the No.1 display unit—that will display the information concerning documentation control for the printed and outputted paper and is correspondingly placed nearby each one of the discharge units. Concerning the discharge units, except for the special discharge unit 14, each one of the personal computers can specify units for discharge where the paper with produced images is discharged. However, concerning the special discharge unit 14, personal computers cannot specify units for discharge; instead, the special discharge unit 14 contains the paper with produced images that is discharged based on the commands sent from the operation unit in the main body of the printer.

Controller 3 in printer 1, after receiving data from personal computers, will search whether or not there are any discharge trays that have not contained any paper in the discharge units 11 through 13 as part of the No.1 paper stack tray. It will discharge the paper with produced images into discharge trays if there are any discharge trays that do not contain any paper. This process is taken so that different kinds of documents are not intermingled in the same discharge tray. Furthermore, if all the discharge trays contain paper and if a command to output image data is sent and the image data is included in a group that is different from the already-discharged image data, no image will be produced; instead, the image data will be stored in memory 5. The data that is stored in memory 5 can produce images and discharge them based on the command given in the operation unit that is equipped in the main body of printer 1. The paper will be discharged into discharge unit 14—the No.2 paper stack. Also, when the paper discharge sensors 15 through 18 detect the fact that the paper stacked in the discharge trays 11T through 14T is removed, the indication on the display units 19 though 22 will be erased.

Due to the above-mentioned processes, at least one discharge unit, or the discharge unit 14 will be kept vacant even though many documents are sent from external sources and the images are outputted. Also, if all of the discharge units, except for discharge unit 14, are used, subsequent documents are not outputted and will be stored in memory 5 so that they are not intermingled with other documents. Therefore, if a user came to pick up the paper in the location where printer 1 is placed after the user had transmitted data from external devices and found that the discharge unit was used by some other documents and that the image output of the necessary documents had not been performed, the user can operate the operation unit in the main body of the printer to display multiple pieces of information concerning documentation control that is stored on display unit 4 in the main body and to discharge necessary documents in the specified discharge unit 14. There are many cases that the discharged paper is not collected immediately and is kept untouched if printer 1 is not located close to the personal computers. Even under this circumstance, multiple documents can be prevented from being intermingled and necessary documents can be easily distinguished.

Figure 2:
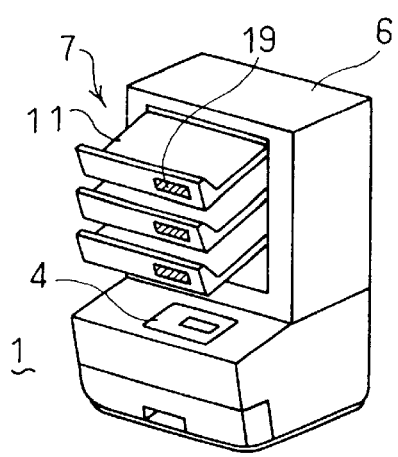
FIGS. 2(a), 2(b), 2(c) and 2(d) are figures illustrating the appearance of each printer respectively.
Figure 2:
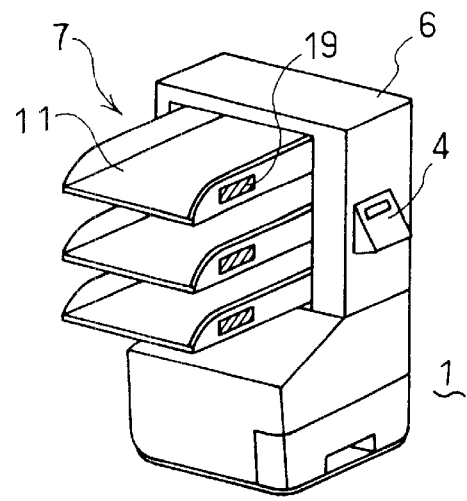
Figure 2:
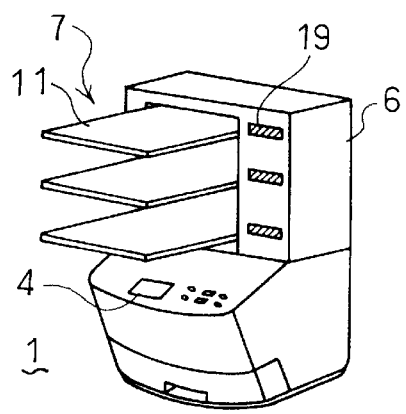
Figure 2:
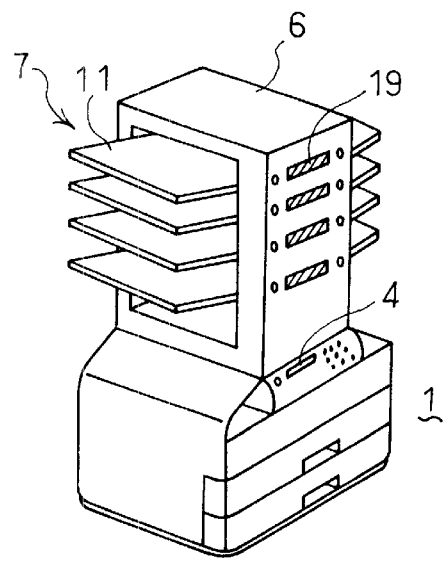

FIGS. 2(a), 2(b), 2(c) and 2(d) respectively illustrate the appearance of printer 1. In FIG. 2(a), the display unit is set up at the tip of the discharge tray. In FIG. 2(b), the display unit is set up on the side of the discharge tray. In FIGS. 2(c) and 2(d), the display unit is set up on the fore flank of the discharge tray.

Figure 3:
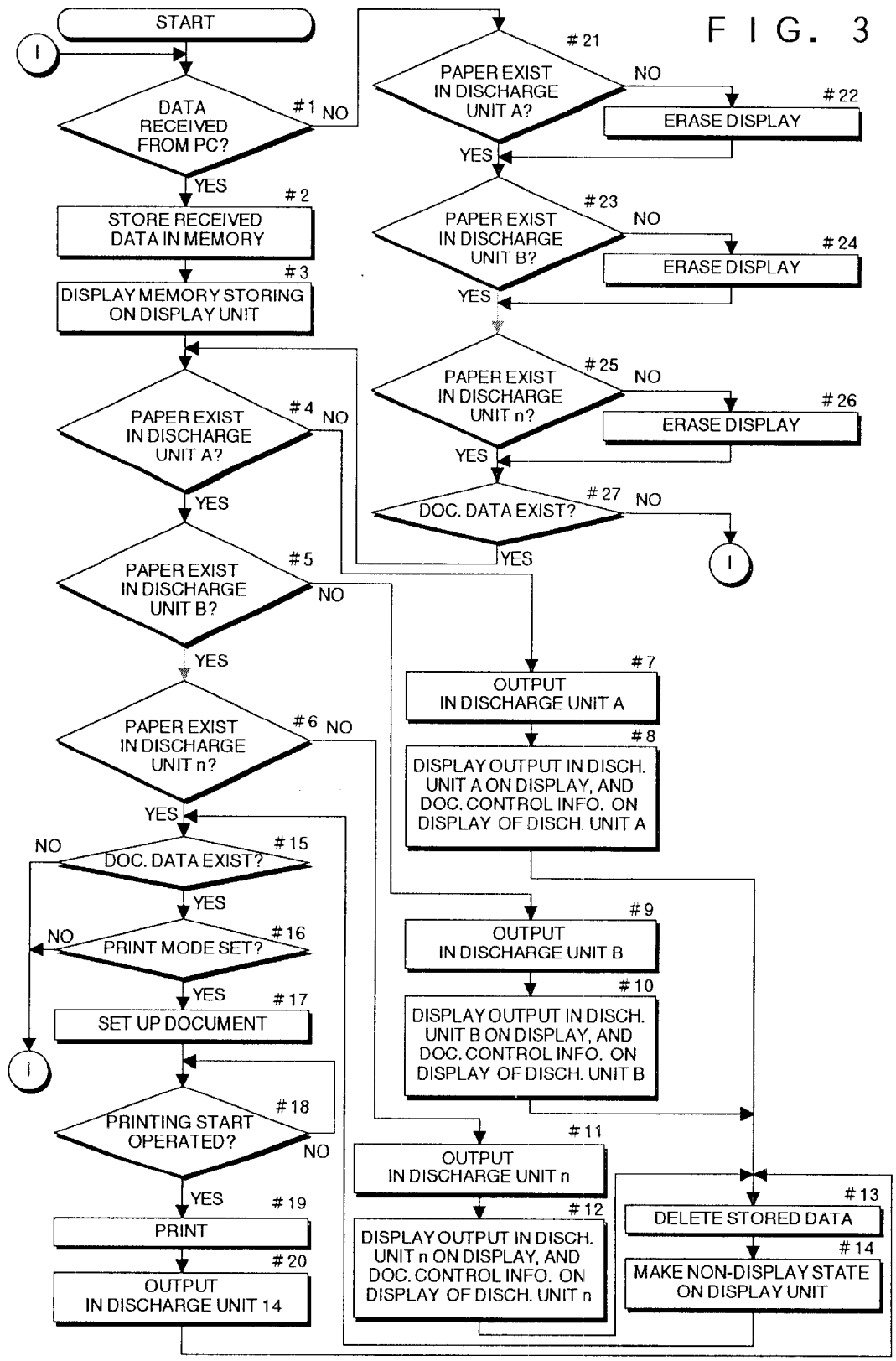
FIG. 3 is the flow chart illustrating the operational procedures of the printers.

FIG. 3 illustrates the flow chart to show the operational procedures regarding printer 1. In these procedures, the machine will automatically search vacant discharge units and output data based on the sequence that the data is inputted. Once the data is received from a personal computer (#1/YES), the received data will be stored in memory 5 (#2) and the display unit in the main body will display the information that memory 5 has stored the data (#3). The examples of the display are illustrated in FIG. 4(a). Furthermore, the machine will search whether or not there is any paper in discharge tray A (#4). If there is no paper in the discharge unit A, images will be outputted in discharge unit A (#7). Display unit 4 in the main body will display the information that the images are outputted in discharge unit A and will display the information of documentation control regarding the documents that are outputted on the display unit of discharge unit A (#8). Now, FIG. 4(*b*) is the illustrated example to show the information concerning documentation control on the display unit located in discharge unit A when the data from a personal computer(s) is outputted. If there is paper in discharge unit A in the #4 process, it will check whether or not there is any paper in discharge unit B (#6) as a next step. If there is no paper in discharge unit B, images will be outputted in discharge unit B (#9) and display unit 4 in the main body will display the information that the images are outputted in discharge unit B; at the same time, the display unit in discharge unit B will display the information concerning the documentation control (#10). These procedures will be applied to discharge unit n–#6, #11 and #12. After #8, #10 and #12 are processed, the data that is stored in memory 5 will be deleted (#13). Of all the displays on display unit 4 in the main body, the displays concerning the outputted documents will be non-displayed (#14). FIG. 4(*c*) illustrates examples of displays.

After going through the processes of #14 and #6, it will be checked whether document data exists or not (#15). If it does, it will check whether the printing mode is set up or not (#16). If it does, it will set up the documents that are to be outputted (#17). Under this setting, the documents from personal computer A, as an example, will be set up. If the operational instruction is given to start printing by the user (#18), it will start printing (#19) and the documents will be outputted to the specified paper display unit 14 (#20). After this process, the data that is stored in memory 5 will be deleted (#13) and the displays of documentation information concerning the outputted documents on display unit 4 in the main body will be non-displayed (#14). FIG. 4(*d*) illustrates the examples of displays. When there is no document data in #15 and the printing mode is not set up in #16, these processes will return to #1. Also, if the data is not received in #1, it will check whether the paper exists in discharge unit A or not (#21). If there is no paper, the display located in the discharge unit will be erased (#22). If there is paper, it will check whether there is paper in discharge unit B . . . to discharge unit n (#23/#25). If there is no paper, the display on the display unit will be erased (#24/#26). Subsequently, it will check whether document data exists or not (#27). If there is any document data, it will proceed to #4; whereas, if there isn't, it will return to #1.

As is illustrated in FIG. 4(*a*), the displays will include the transmitting side of data and document name as the information concerning documentation control, which will be displayed in such a manner as, "PC(A), materials for meeting A, PC(B), materials for meeting B, PC(C) and materials for meeting C." The latest information will be displayed on the above. As illustrated in FIG. 4(B), the display on the display unit located in the discharge unit will include the transmitting side of outputted data and document name. At this stage, if the data from PC(C) is outputted in discharge unit A, the display will show "PC(C)/materials for meeting C." The display illustrated in FIG. 4(*c*) is the one when #8, #10 and #12 are processed, where "PC(C)/materials for meeting C" is erased in the above-mentioned display. The display in FIG. 4(*d*) is the one when #20 is processed. Concerning this example, "PC(A) /materials for meeting A" is erased from the above-mentioned display because this process takes place after the documents from PC(A) are printed out.

Figure 5:
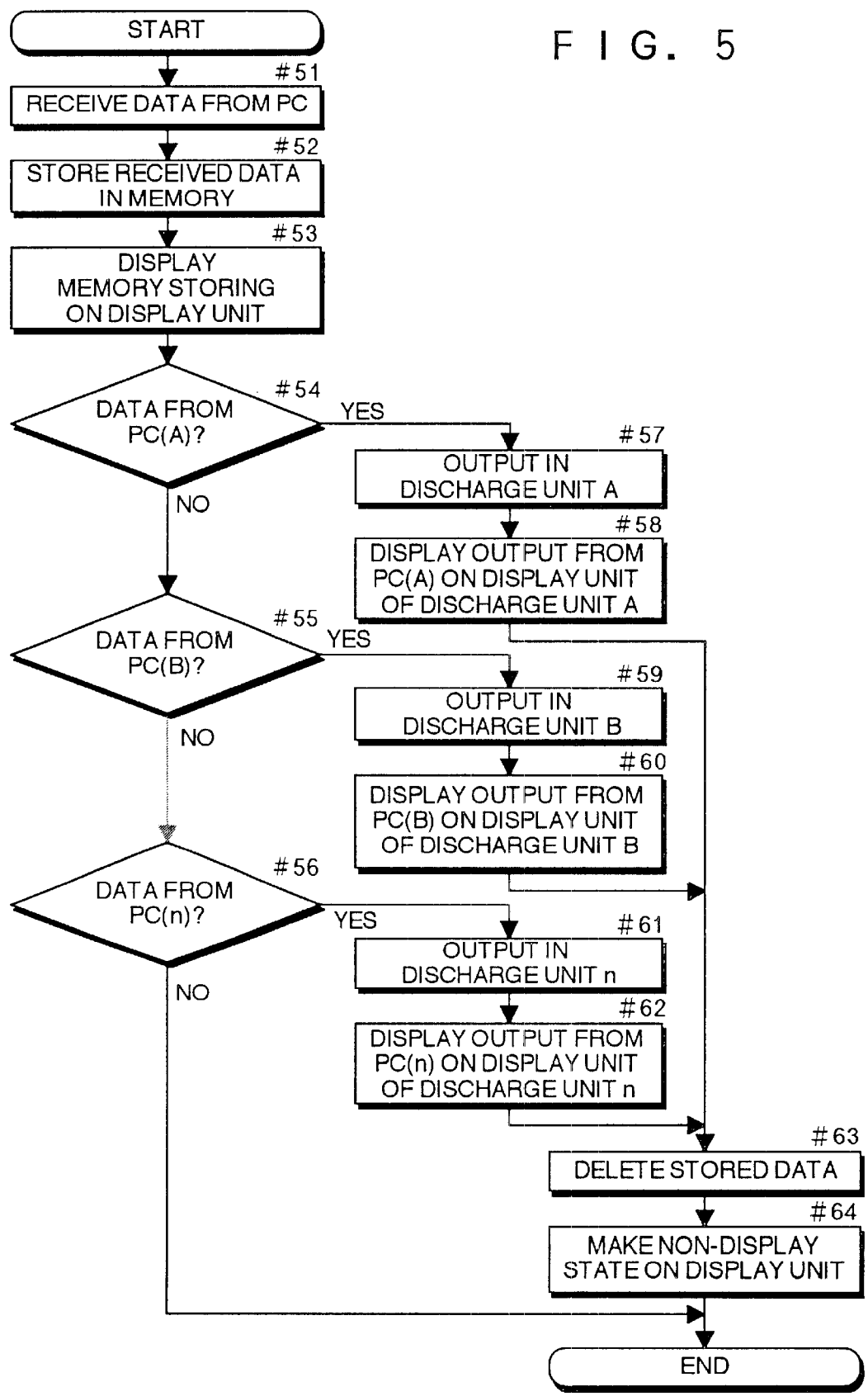
FIG. 5 is the flow chart illustrating other examples of operational procedures in printer.

FIG. 5 illustrates the flow chart that shows other examples of operational procedures pertaining to the printer 1. As this example demonstrates, controller 3 in printer 1, if the data that is received from the personal computer includes data that designates the discharge unit, will produce images from the data and discharge it; as a result, the paper will be discharged into the specified discharge trays 11T through 14T in the No.1 paper stack based on the command data. Whereas, even if the received data contains the data that designates a discharge unit, but the designated discharge unit has already been discharged with paper, the images will not be produced or discharged using the data; instead, the data will be stored in memory 5. Also, if the received data does not contain the data that designates a discharge unit, the images will not be produced or discharged using the data; instead, the data will be stored in the memory 5. The stored data in memory 5 can produce images and/or discharge them with the operational instruction from the operation unit and the paper will be discharged into discharge unit 14, or the No.2 paper stack. As the situation is such, the data will be outputted with priorities in pre-designated discharge units. In other words, this is the case where the pre-setting for prioritized output is respectively made—a) the data from the personal computer PC(A) will be outputted in discharge unit A, b) the data from the personal computer PC(B) will be outputted in discharge unit B . . . and c) the data from the personal computer, PC(n) will be outputted in discharge unit n. If the data from the personal computers is received (#51/YES), the received data will be stored in memory 5 (#52) and display unit 4 in the main body will display the information that the data is stored in memory 5 (#53). For example, if the machine received two (2) kinds of data —the materials for meeting A and the materials for meeting B—from the same transmitting side A, the display will show "transmitting side: PC(A)/document name: materials for meeting A" and "transmitting side: PC(A)/document name: materials for meeting B." Subsequently, it will check whether the received data is the data from PC(A) or not and if it is the case, the data will be outputted to discharge unit A (#57) and the display unit in discharge unit A will display that the data was outputted from PC(A) (#58). At this point, the above-mentioned contents will be displayed side by side.

In the process of #54, if the data is not the one from PC(A), the machine will check if the data is from PC(B) as a next step (#55). If that is the case, the data will be outputted in discharge unit B (#59) and the display unit in discharge unit B will display that the data is outputted from PC(B) (#60). Subsequently and just like the above, it will check if the data is from PC(n) (#56). The same procedures will be applied to the rest of processes (#61/#62). As a next step, the data that is stored in the memory 5 will be deleted (#63) and the display on display unit 4 of the main body will be changed to non-display (#64). The processes are closed at this point. If either one of the processes #54, #55 and #56 indicates "NO," the processes will be closed.

Figure 6:
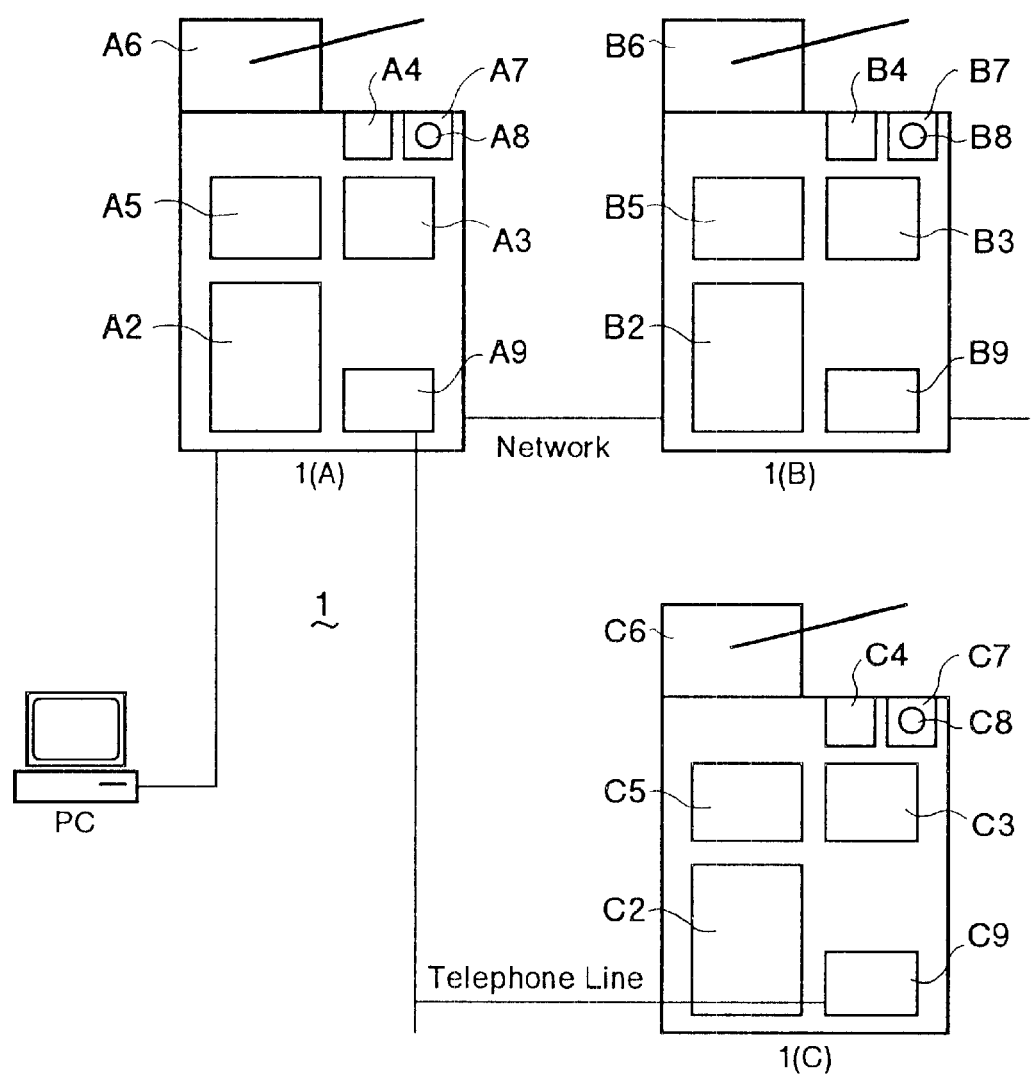
FIG. 6 is the view illustrating the composition of the printing system comprising the function to control data in the second embodiment in this invention.

FIG. 6 displays the composition of the printing system comprising the function to control data as the second embodiment of the present invention. This system comprises printers—1(A), 1(B) and 1(C)—that are connected to the network and one personal computer as an external device that is connected to these printers. These printers that are connected to the network are connected to telephone lines too. Each one of the printers comprises the same composition. Printer 1(A) is equipped with printing unit A2, controller A3 that controls the printers, display unit A4 in the main body that displays various information concerning the documentation control, memory A5 that stores the image data that is to be outputted, discharge device A6 where the paper is discharged after the images are outputted, operation unit A7 in which users give commands of printing and others to the main body of the printer, confirmation mode switch A8 and modem A9. Concerning the other printers—1(B) and 1(C), corresponding members are given the same codes. The operation unit in the printers is equipped with a ten—keyboard to set up the number of copies, a keyboard to set up printing mode and others.

Figure 7:
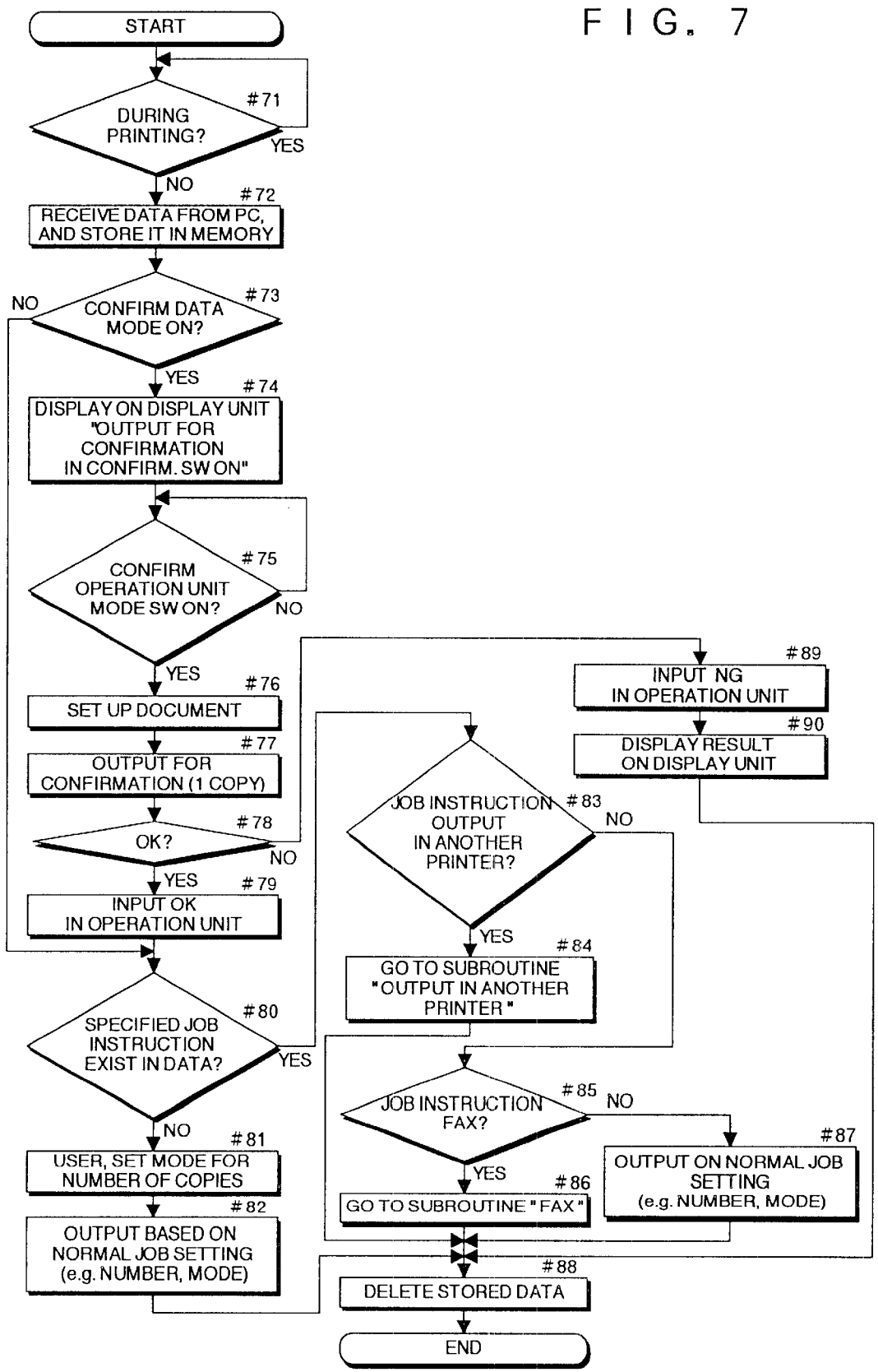
FIG. 7 is the view flow chart illustrating the operational procedures of printers in the second embodiment.

FIG. 7 illustrates the flow chart to show the operational procedures of printers as the No.2 form of execution. This example demonstrates that the machine is capable of outputting multiple copies, using another printer for output and/or sending faxes, etc. after one (1) copy is outputted using the confirmation mode switch and after the outputted contents are actually confirmed.

Unless the machine is printing (#71/NO), it will receive data from a personal computer and the data can be stored in the memory (#72). The data from a personal computer includes document name, ON/OFF information pertaining to confirmation mode, contents of documents, job instructions to output using another printer and to transmit faxes, normal job instructions—the number of copies and printing mode, designated job instructions and others. It will be checked whether the data confirmation mode is set up as "ON" (#73), as a next step. If the answer is "YES" and once users turn one of the following switches "ON"—the confirmation mode switches of A8, B8 and C8 located in the operation unit A7, B7 and C7 (#75/YES), the document will be specified for set up (#76) and one (1) copy will be outputted to confirm the contents (#77).

After this process is completed, the user will confirm the outputted contents (#78/YES). If they are "OK," the user will instruct and input "OK" in the operation unit (#79). After that, the user will check whether specified job instruction exists in the data or not (#80). If there is no job instruction, the user will set up a mode for the number of copies (#81) and the machine will print out hard copies based on the contents of a normal job setting that includes the number of copies and others (#82). If the determination in #80 is "YES," the machine will check if the job instruction instructs another printer to be used for output (#83). In that case, the process will go to the subroutine output in another printer (#84). Otherwise, the job instruction will be checked to see if it indicates a fax machine (#85). If it is "YES," the process will go to the subroutine in the fax machine (#86). If it is "NO," hard copies will be printed out based on the contents of normal job instruction—a mode and the number of copies (#87). After the processes are completed in #82, #84, #86 and #87 as described earlier and in #90 as described later, the data in the memory will be deleted (#88), which ends the processes.

If a result of output confirmation in #78 is not "OK," the command, "NG" is inputted in the operation unit (#89) and the result will be displayed on the display unit (#90).

Also, if the data confirmation mode is not set up as "ON" in #73, #74 through #79 will not be processed; instead, the process is immediately furthered to #80. In other words, if the received data does not contain any information that will show data confirmation, the printer will be controlled based on the received data as is illustrated in #80 and subsequent processes.

Figure 8:
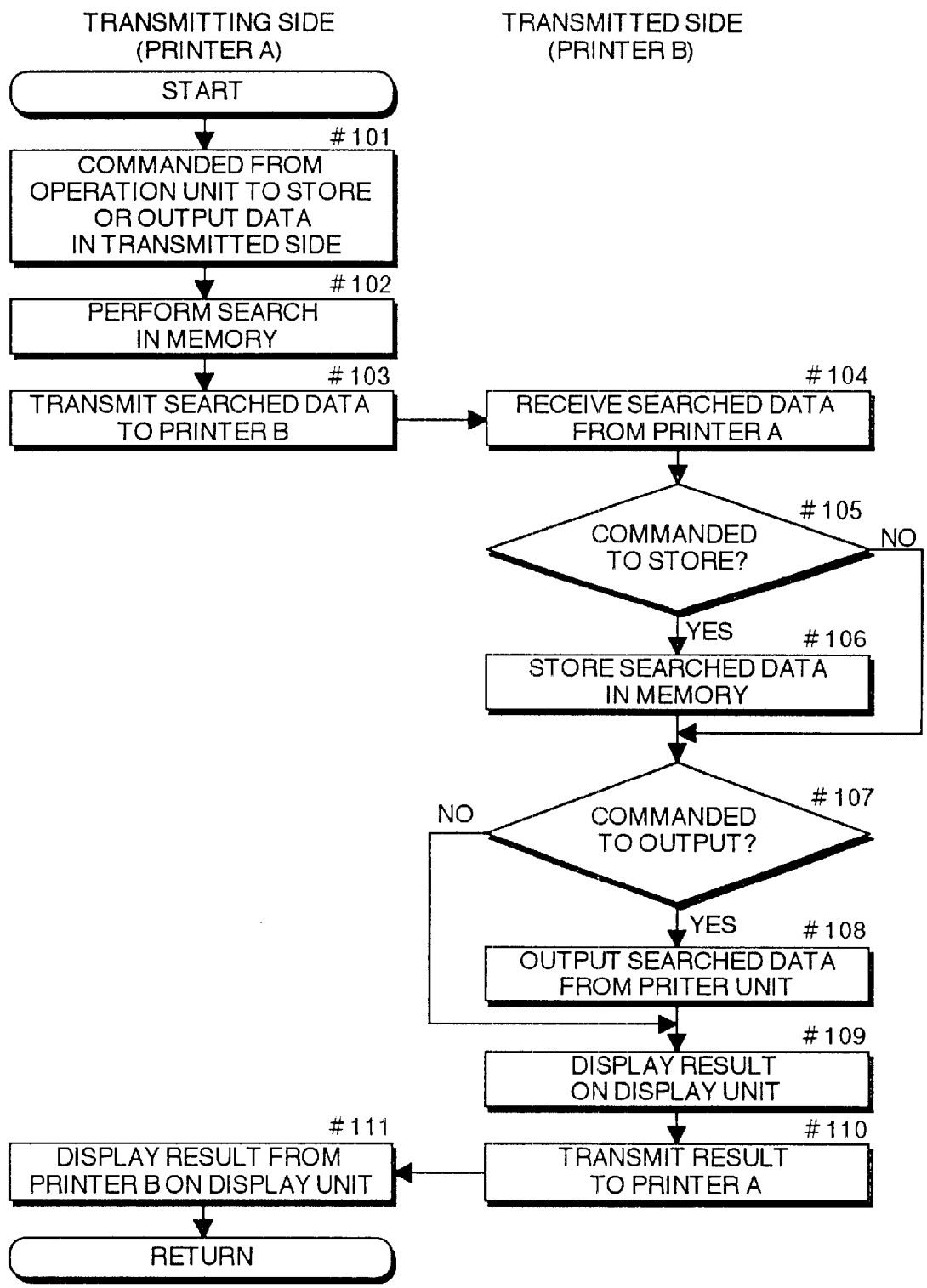
FIG. 8 is the view illustrating the subroutine when the command is made to print from another printer in the second embodiment.

FIG. 8 illustrates the subroutine when the instructions are made to use another printer for output in the No.2 form of execution. Under this routine, the left column indicates a printer of the transmitting side (i.e.—printer A) and the right column indicates a printer of the transmitted side (i.e.—printer B). The operation unit in the printer on the transmitting side will give commands pertaining to data storage and output on the transmitted side (#101). Subsequently, the data memory will be searched (#102) and the searched data will be transmitted to printer B (#103). The printer on the transmitted side will receive searched data sent from printer A (#104) and check if there is any command about storing searched data in the memory (#105). If any, searched data will be stored in the memory (#106). It will also check if there is any command to output data (#107) and if there is any, searched data will be outputted in the printing unit (#108). The result will be displayed on the display unit (#109); furthermore, it will be transmitted to printer A (#110). However, if there is no command about storing searched data in the memory in #105, the data will not be stored in #106 and the process proceeds to #107. If there is no command for output in #107, there is no output transaction in #108 and the process proceeds to #109. After the result is transmitted in #110, printer A will display the result from printer B on the display unit (#11) and the "return" process will resume.

Figure 9:
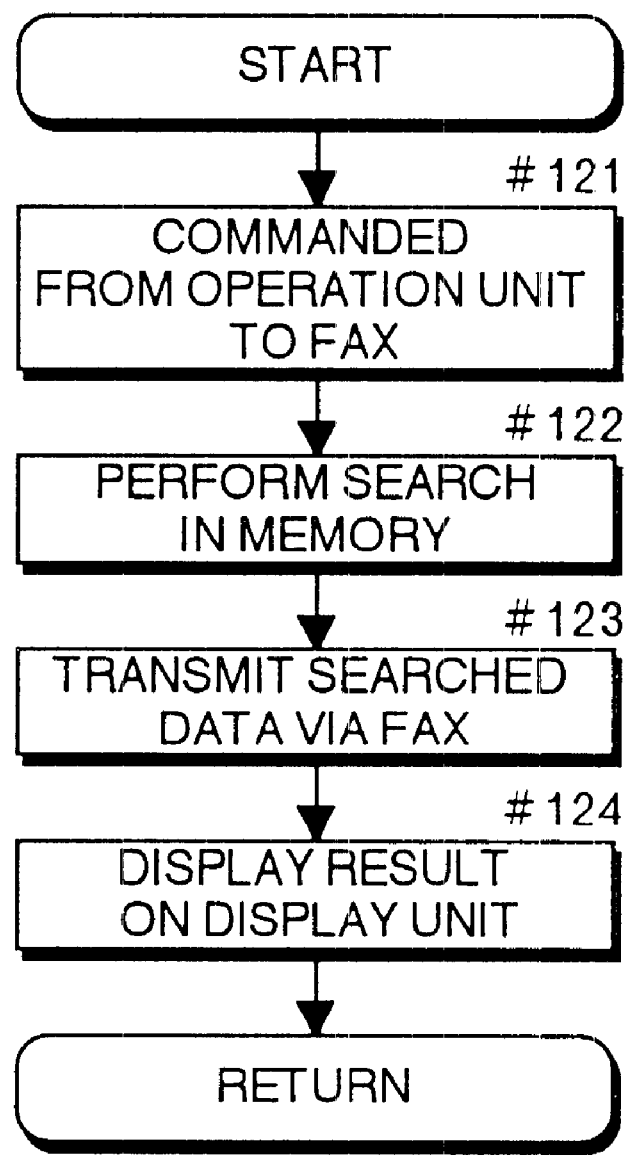
FIG. 9 is the view illustrating the subroutine when the printers perform fax transmission in the second embodiment; and, FIG. 10 is the flow chart illustrating data research in the printers that are connected to the network in the second embodiment.

FIG. 9 illustrates the subroutine when the printer performs fax transmission in the No.2 form of execution. The operation unit will give commands for fax transmission (#121), will perform search in the memory (#122) and will transmit searched data via fax (#123). Thus, the result will be displayed on the display unit (#124).

Figure 10:
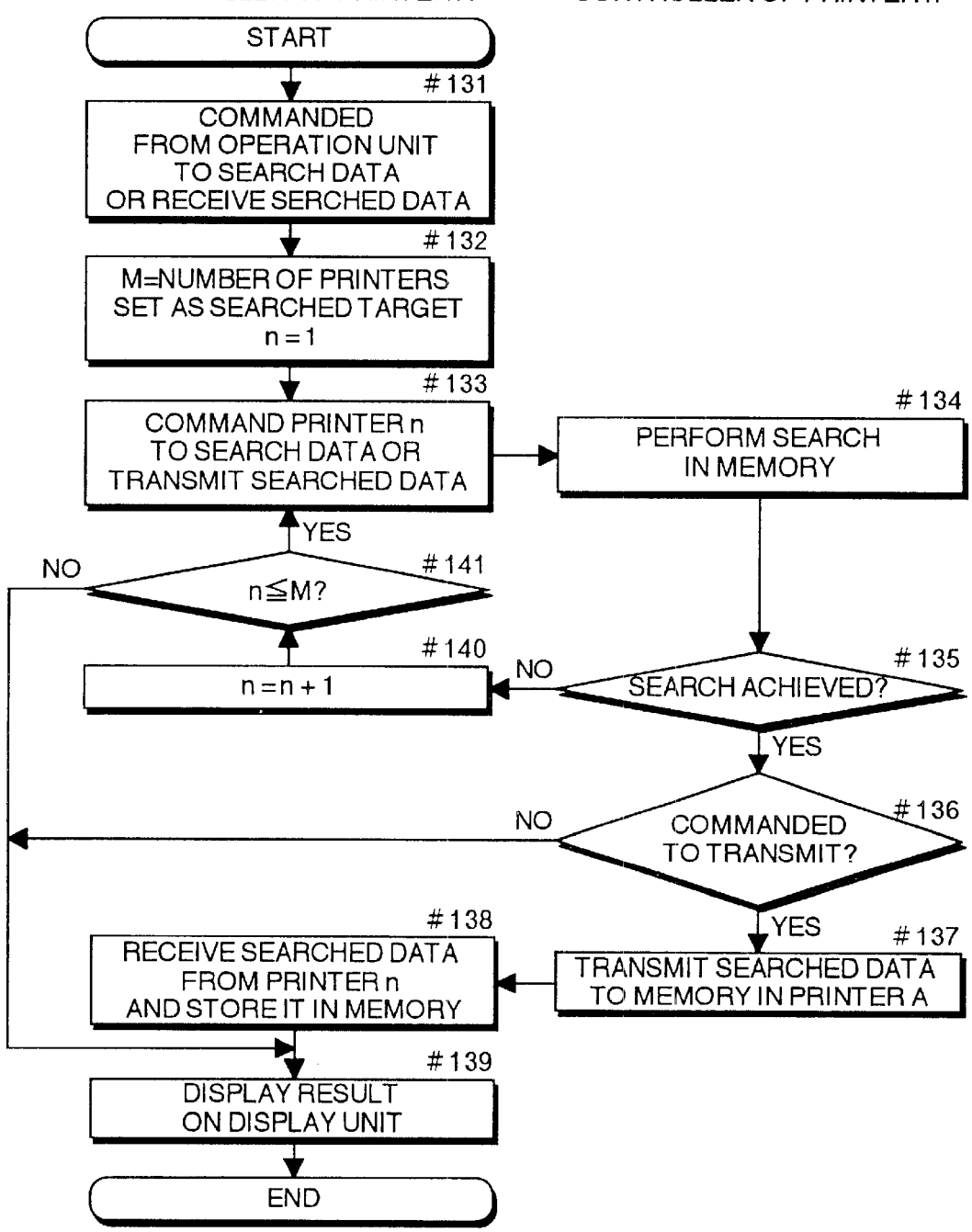

FIG. 10 illustrates the flow chart where data search will be performed in the printer that is connected to the network in the second embodiment. According to this system, the operation using the operation unit in the printer will enable necessary data to be searched and/or the searched data to be received through the network. The processes performed by the controller of printer A are illustrated on the left column and the processes performed by the controller of printer n are illustrated on the right column. The commands using the controller's operation unit in printer A will be made to search necessary data and/or to receive the searched data (#131). We made it a rule that "M" equals the number of printers that is set up as a searched target. Under the condition that we apply the rule that "n=1" (#132) is applied for now, the command to search data and transmit searched data will be made to printer n (#133). The controller in printer n will search the memory based on the command to search data (#134). If the search is achieved successfully (#135/YES), whether or not there is a command to transmit data will be checked (#136). If there is any, searched data will be transmitted to the memory in printer A (#137). As a result, printer A will receive the searched data from printer n and store it in the memory (#138) and the result will be displayed in the display unit (#139), which ends the processes. If the search is not achieved successfully in #135, the rule "n=n+1" (#140) is applied. After checking if "n" is below "M" (#141) and if the answer is "YES," the process will be resumed at #133 and the same processes will be made again. If it is "NO," the process will be furthered to #139 now that all the printers are searched. The process will also be furthered to #139 when there is no command to transmit data in #136.

Furthermore, this invention is not limited to the composition of the above-mentioned forms of execution. Any variation pertaining to this invention can be applied as long as the purposes of this invention do not change.

What is clamed is:

1. An image producing apparatus comprising:
    an image producing unit for producing an image on a recording sheet based on image data which is received from an external device;

a memory unit for storing the image device received from the external device;

a first discharge unit which has a plurality of discharge trays for containing recording sheets with produced images discharged from the image producing unit;

a second discharge unit which has at least one discharge tray for containing a recording sheet with a produced image discharged from the image producing unit;

an operation unit for receiving a user's instruction; and a control device for discharging a recording sheet with a produced image into the first discharge unit unless a user's instruction is received by the operation unit to produce an image based on the image data stored on the memory unit, and for, when the user's instruction is received by the operation unit, controlling the image producing unit to produce an image on a recording sheet based on the image data stored on the memory unit and discharging the recording sheet into the second discharge unit.

2. An image producing apparatus as claimed in claim 1, wherein the control device produces an image on a recording sheet based on the image data received from the external device and discharges the recording sheet with the produced image into a specified discharge tray if the image data contains data that specifies a discharge tray and the specified discharge tray is empty, and the control device stores the image data received from the external device on the memory unit without image production if the image data does not contain data that specifies a discharge tray or the image data contains the data that specifies a discharge tray but a specified discharge tray is not empty.

3. An image producing apparatus as claimed in claim 1, wherein the control device stores the image data received from the external device on the memory unit without image production if all discharge tray are not empty in the first discharge unit when the image data is received from the external device.

4. A method for discharging recording sheets with produced images into respective appropriate places in an image producing apparatus, the method comprising following steps of:

producing an image on a recording sheet based on image data which is received from an external device;

discharging a recording sheet with a produced image into a first discharge unit, which is provided with the image producing apparatus and has a plurality of discharge trays for containing recording sheets, unless a user's instruction to produce an image is received via an operation unit provided on the image producing apparatus; and discharging a recording sheet with a produced image into a second discharge unit, which is provided with the image producing apparatus and has at least one discharge tray for containing a recording sheet, when the user's instruction is received via the operation unit.

* * * * *